(12) United States Patent
Okayama

(10) Patent No.: US 9,151,898 B2
(45) Date of Patent: Oct. 6, 2015

(54) OPTICAL DEVICE

(71) Applicant: Oki Electric Industry Co., Ltd., Tokyo (JP)

(72) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 100 days.

(21) Appl. No.: 13/781,745

(22) Filed: Feb. 28, 2013

(65) Prior Publication Data

US 2013/0259425 A1    Oct. 3, 2013

(30) Foreign Application Priority Data

Mar. 30, 2012   (JP) ................. 2012-081077

(51) Int. Cl.
  *G02B 6/26* (2006.01)
  *G02B 6/42* (2006.01)
  *G02B 6/30* (2006.01)
  *G02B 6/125* (2006.01)
  *G02B 6/28* (2006.01)
  (Continued)

(52) U.S. Cl.
  CPC ............... *G02B 6/305* (2013.01); *G02B 6/125* (2013.01); *G02B 6/2813* (2013.01); *G02B 6/30* (2013.01); *G02B 6/12016* (2013.01); *G02B 6/1228* (2013.01)

(58) Field of Classification Search
  CPC .......... G02B 6/12016; G02B 6/12007; G02B 6/1228; G02B 6/2804; G02B 6/305; G02B 6/2813; G02B 6/125; G02F 1/3137
  USPC ........ 385/14, 15, 31, 39, 43–45, 49, 129, 130
  See application file for complete search history.

(56) References Cited

U.S. PATENT DOCUMENTS 5,410,625 A * 4/1995 Jenkins et al. ................. 385/28
6,643,432 B2 * 11/2003 Bouda ............................ 385/43
7,577,328 B2 * 8/2009 Miyadera et al. .............. 385/47
(Continued)

FOREIGN PATENT DOCUMENTS

WO    WO-9512828 A1    5/1995
WO    WO-2010010878 A1    1/2010

OTHER PUBLICATIONS

Yamada, Hirohito et al.; "Si Photonic Wire Waveguide Devices"; The Institute of Electronic, Information and Communication Engineers; IEICE Trans. Electron., vol. E90-C, No. 1; Jan. 2007; pp. 59-64.
(Continued)

*Primary Examiner* — Kaveh Kianni
*Assistant Examiner* — Hung Lam
(74) *Attorney, Agent, or Firm* — Rabin & Berdo, P.C.

(57) ABSTRACT

An optical device includes an optical waveguide including a core and a cladding, and includes a wide optical waveguide. An input optical waveguide is connected with one side the wide waveguide and output optical waveguides are connected to an opposite side of the wide waveguide. Center intervals between adjacent ones of the output waveguides meet either a condition 1 that the center intervals are wider than or equal to 4ë', where ë' is the optical wavelength in the wide waveguide, or they meet a condition 2 that the center intervals are narrower than 4ë' and adjacent output waveguides are disposed at intervals shorter than a length in which optical signals that propagate through each of the output waveguides interact with each other.

9 Claims, 6 Drawing Sheets

(51) Int. Cl.
*G02B 6/12* (2006.01)
*G02B 6/122* (2006.01)

(56) References Cited

U.S. PATENT DOCUMENTS

| | | | |
|---|---|---|---|
| 2001/0053262 A1* | 12/2001 | Kinoshita et al. | 385/24 |
| 2004/0105677 A1* | 6/2004 | Hamada | 398/79 |
| 2006/0067622 A1* | 3/2006 | Hayashi et al. | 385/45 |
| 2007/0071388 A1* | 3/2007 | Lu | 385/37 |

OTHER PUBLICATIONS

Chang, Hsu-Hao et al.; "Integrated Hybrid Silicon Triplexer"; Optics Express 23891; vol. 18, No. 23; Nov. 2010.

Bidnyk, Serge et al.; "Silicon-on-Insulator-Based Planar Circuit for Passive Optical Network Applications"; IEEE Photonics Technology Letters; vol. 18, No. 22; Nov. 15, 2006; pp. 2392-2394.

Feng, Ning-Neng et al.; "Low-Loss Polarization-Insensitive Silicon-on-Insulator-Based Wed Filter for Triplexer Applications"; IEEE Photonics Technology Letters; vol. 20, No. 23; Dec. 1, 2008; pp. 1968-1970.

* cited by examiner

OPTICAL DEVICE

CROSS-REFERENCE TO RELATED APPLICATION

This application claims priority under 35 U.S.C. §119 from Japanese Patent Application No. P 2012-081077, filed on Mar. 30, 2012, the disclosure of which is incorporated herein by reference.

BACKGROUND OF THE INVENTION

1. Field of the Invention

This application relates to the art of optical devices that partition input optical signals into the output ports.

2. Description of Related Art

The publications in the journal "Photonics Technology Letters," at vol. 18, p. 2392 (November 2006) and vol. 20, p. 1968 (December 2008), and the publication in the journal "Optics Express," at vol. 18, p. 23891 (October 2010), describe an optical device, namely a waveguide that comprises a core and a cladding. The core is made with silicon (Si). The cladding is made with silicon dioxide ($SiO_2$). Such a waveguide that comprises a core and a cladding may be termed herein a "Si-waveguide" or "Si-optical waveguide."

The Si-optical waveguide may curve so as to bend an optical signal in a small radius of curvature of approximately 1 μm, because the difference in the index of refraction respectively of the core and cladding is large enough that the Si-waveguide may guide optical signals with relatively little power loss. The Si-waveguide may also have a submicron cross section structure that is small, because the Si-waveguide may be manufactured using processing techniques associated with silicon electronic devices.

An optical device may be downsized to as small as a silicon-electronic device using the Si-waveguide. An example of an application of the Si-waveguide is a power divider element. The wavelength separation element may partition an optical signal without changing the phase and wavelength of the optical signal. In general, such waveguides as the Y-branch waveguide and MMI waveguide are used as power divider elements.

PCT Laid-Open Patent Publication Nos. WO1995/012828, and WO2010/010878 describe that a 1*N coupler (N branch-line coupler) using the MMI waveguide may be tolerant of a dimensional error. Although the design of an MMI waveguide may include some dimensional errors, the differences in optical intensity at each of the output ports of the MMI waveguide may be suppressed. The wavelength separation element may be termed an MMI type 1*N coupler.

However, although a power divider element should ideally be designed so that an optical signal can be partitioned equally into each of the output ports, there tend to be differences in the optical intensity in each of the output ports in a Si-waveguide using the MMI type 1*N coupler (e.g. Si-type 1*N MMI coupler). It is difficult to design an optical circuit including the MMI type 1*N coupler, because the design of the optical circuit must take into account the differences in optical intensity among the output ports.

SUMMARY OF THE DISCLOSURE

An optical device capable of decreasing differences in optical intensity among the output ports of a Si-type 1*N MMI coupler is disclosed.

According to one aspect, an optical device may include an optical waveguide comprising a core and a cladding, and having a wide optical waveguide (planar optical waveguide). An input optical waveguide is connected with an input side of the wide optical waveguide and multiple output optical waveguides are provided on an output side (opposite side from the input side) of the wide optical waveguide. Center intervals between adjacent output optical waveguides must meet one of the following conditions 1 and 2.

The condition 1 is that the center intervals are wider than or equal to $4\lambda'$, where $\lambda'$ is the optical wavelength in the wide waveguide. The condition 2 is that when the center intervals are narrower than $4\lambda'$, the adjacent output waveguides are disposed at intervals shorter than a length for which the output waveguides interact with each other.

When a Si-optical waveguide is employed, differences in output-optical intensity among the output waveguides appear. Meanwhile, when an MMI type 1*N coupler is comprised of a silica-based waveguide, a compound semiconductor-based optical waveguide, or a rib waveguide that employs Si or other materials, differences in output optical intensity do not appear. The appearance of differences in output optical intensity among the output waveguides may be thought to be the cause that the size of the Si-type 1*N MMI coupler is as small as the optical wavelength (about 1 μm). That is, when that size of 1*N coupler is employed, the penetration length (less than 100 nm) of optical field distribution from core to cladding may be measurable. The amount of difference between a perfect 1*N coupler (no penetration length) and a 1*N coupler with a measurable penetration length would be larger with increasing penetration length.

BRIEF DESCRIPTION OF THE DRAWINGS

The optical device will be more fully understood from the following detailed description with reference to the accompanying drawings, which is given by way of illustration only, and is not intended to limit the scope of the invention, wherein.

DETAILED DESCRIPTION OF THE INVENTION

Figure 1A:
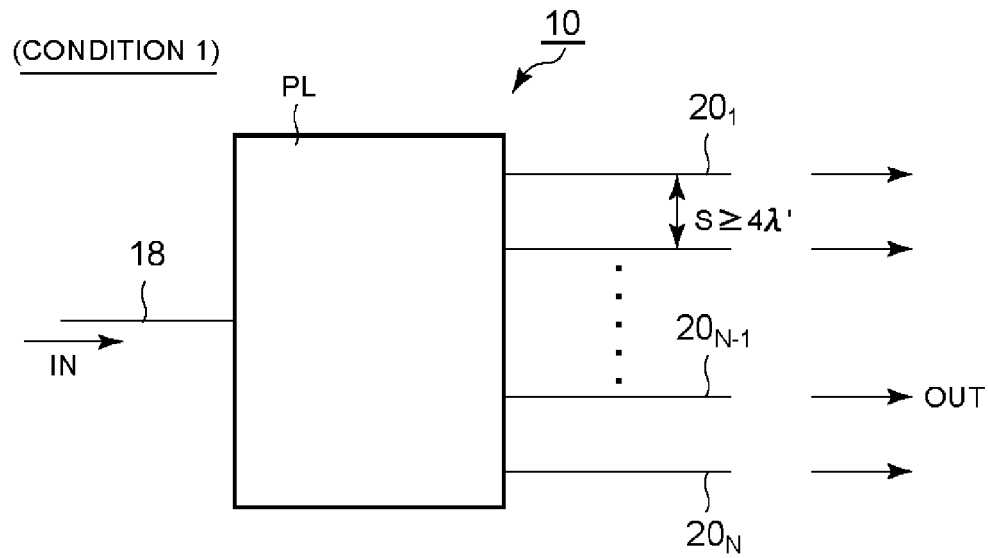
FIG. 1A is a schematic plan view that illustrates the composition of an optical device having center intervals between centers of output ports that satisfy a condition 1.

The optical device will be described with reference to FIGS. 1A to 6 of the drawings, in which like elements are indicated by like reference characters. In the drawings, configurations, positional relations, dimensions, and alignments of elements of the device are illustrated generally for understanding the embodiment and are only intended to provide an understanding of the invention. Described materials and numerical values are merely exemplary. In the drawings, common elements of structures may be designated by the same reference characters, and an explanation thereof is occasionally omitted. Accordingly, the invention is in no way limited to the following embodiment.

Configuration

The structure of the optical device 10 in FIG. 1A may include a wide optical waveguide PL, an input optical waveguide 18 which is connected to an input side of the wide optical waveguide PL, and to output optical waveguides $20_1$ to $20_N$ at the opposite, output side, where N is an integer more than 2. The optical signal is input from the input waveguide 18 as an input optical signal IN. The input optical signal IN propagates through the wide waveguide PL toward the output waveguides $20_1$ to $20_N$. The wide waveguide PL distributes the input optical signal IN among the output waveguides $20_1$ to $20_N$ and propagates in an optical propagation direction OUT. Referring to the FIG. 1A, center intervals S are intervals between the adjacent output waveguides, that is between each pair of output waveguide $20_y$ and $20_{y+1}$, for each integer y from 1 to N−1. Thus, a center interval S is provided between the output waveguide $20_1$ and the waveguide $20_2$, and between the waveguide $20_3$ and the waveguides $20_4$, and so on. In an embodiment, each of the center intervals S are set to a value such that a condition 1 or a condition 2 is met. Specific designs for the condition 1 and the condition 2 are described below.

Condition 1

Referring to FIG. 1A, the center intervals S may be more than 4λ'. The length λ' is the wavelength of an optical signal to be distributed in the wide waveguide PL. The wavelength of the optical signal may be A in a vacuum, and the wide waveguide PL has a refractive index that is $n_a$, so λ' may be found by division, that is by dividing λ by the $n_a$. Thus, in the condition 1, the center intervals S of the optical signal OUT may be four times longer than the wavelength in the wide waveguide PL. For example, when the wavelength λ is 1.55 μm, and the refractive index $n_a$ is 3.47 (the refractive index of Si), the center intervals S may be more than approximately 1.78 μm.

Condition 2

Figure 1B:
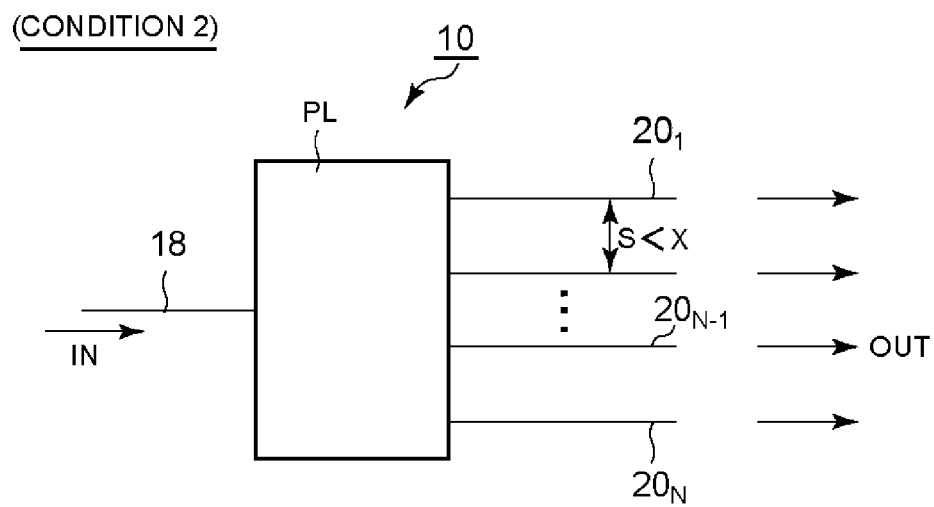
FIG. 1B is a schematic plan view that illustrates the composition of an optical device having center intervals between centers of output ports that satisfy a condition 2.

Referring to the FIG. 1B, when the center intervals S are shorter than 4λ' (S<4λ'), they are shorter than a length X. The length X is the length for which an optical signal that propagates through one output waveguide $20_y$ and another optical signal that propagates through an adjacent output waveguide $20_{y+1}$ can interact with each other, i.e. the length for which the output optical waveguides $20_y$ and $20_{y+1}$ are adjacent, where y is an integer in the range of 1 to N−1 (see, e.g, the length for which the output optical waveguides $20_1$ and $20_2$ are adjacent, as illustrated in FIG. 1B).

As the signals are interactive, the optical power of these signals transfers to the other between the waveguides $20_y$ and $20_{y+1}$. And then, non-uniformity in optical intensity among optical signals OUT may be eliminated. The reason for the differences decreasing is that areas adjacent the waveguides $20_y$ and $20_{y+1}$ may function as a so-called optical directional coupler. When the optical wavelength is on the order of 1 μm, which is used in an optical communication system, the length X is approximately 1000 nm. As the center intervals S are shorter, optical interaction between the output waveguides $20_y$, $20_{y+1}$ is stronger, and makes it easy for optical power to transfer between the waveguides $20_y$, $20_{y+1}$ to decrease non-uniformity in optical intensity among optical signals OUT. The center intervals S of the optical directional coupler may be on the side PL-R (in FIG. 2.).

Optical Device

Regardless of whether optical devices are designed on the basis of the conditions 1 and 2, or not, optical devices that function as MMI type 1*N couplers share a nearly common structure. Therefore, firstly this common structure will be described, and then the optical devices that are designed based on the conditions 1 and 2 will be described.

Figure 2:
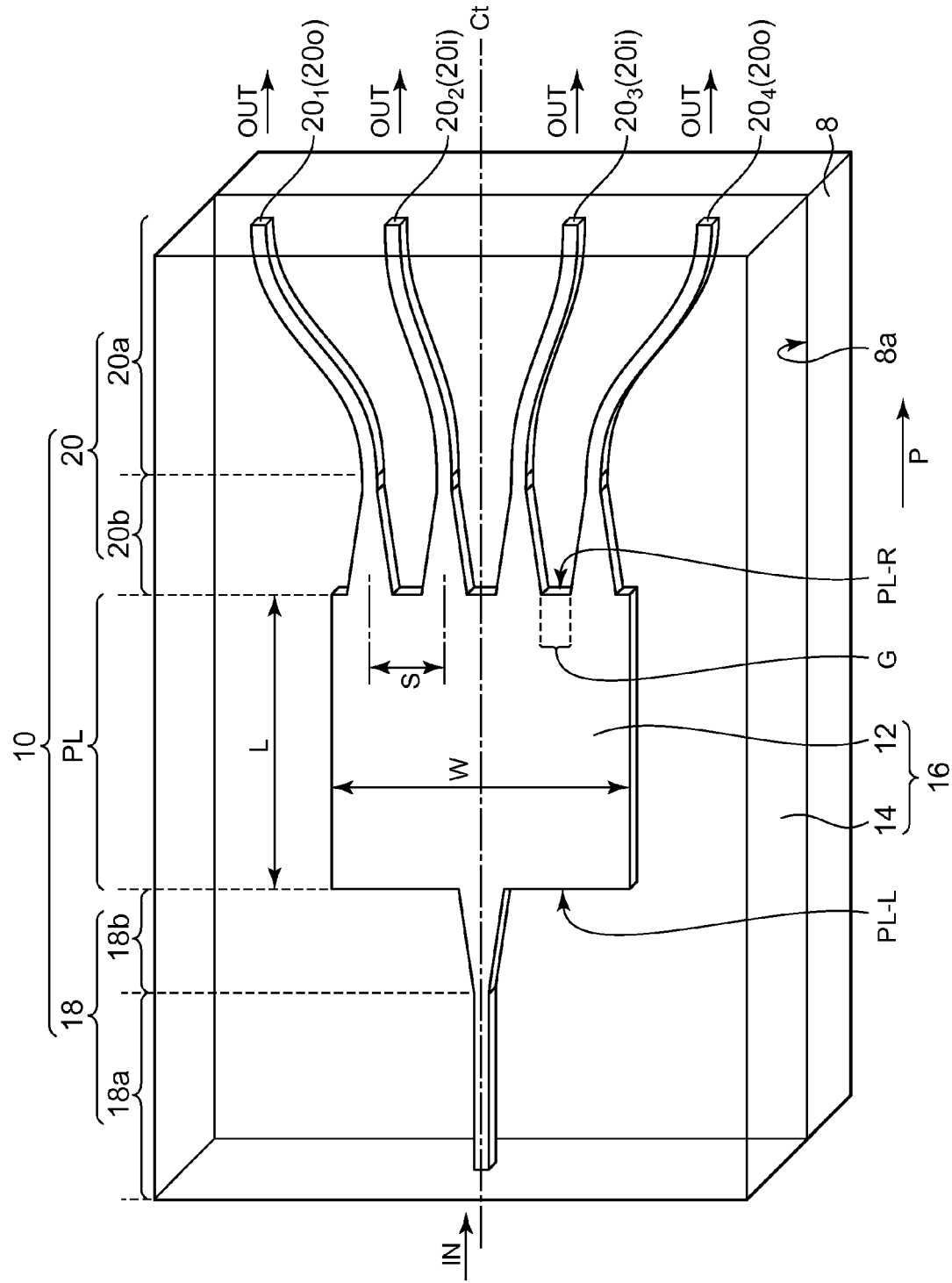
FIG. 2 is a schematic perspective view that illustrates the composition of an optical device.

In the description of the embodiment, terms of direction and dimension are as follows. As shown in FIG. 2, input optical signal IN propagates in the optical direction of propagation P and is designated as the length direction along which length is measured. The widthwise direction is defined as normal to the direction P, and parallel to the major surface 8a. The width is measured in this widthwise direction. The thickness or height direction is normal to the major surface 8a, and the thickness or height is measured in this thickness or height direction. A cross section of the optical device is normal to the optical direction.

The optical device 10 has an optical waveguide 16. The waveguide 16 is comprised of a core 12 and a cladding 14.

It is preferred that the thickness of the core 12 is a range of approximately 200 nm to 500 nm. If the thickness of the core 12 is in this range, the waveguide 16 may be a single-mode optical waveguide. The core 12 is comprised of silicon (Si) whose refractive index ($n_a$) is approximately 3.47.

The cladding 14 is provided on the major surface 8a, which is a plate-like surface. The thickness of the cladding 14 is approximately 4 μm. The core 12 is embedded in the cladding 14. The distance in the length direction between the under surface of the core 12 and the major surface 8a is approximately 2 μm. It is preferred that the thickness of the cladding 14, which is a part between the core 12 and the major surface 8a, is more than 2 μm in order to prevent optical coupling at the substrate 8. The cladding 14 is comprised of silicon dioxide ($SiO_2$) whose refractive index ($n_b$) is approximately 1.45. And here, it is preferred that the relation between $n_a$ and $n_b$ is given by $n_b \leq (1/1.4)*n_a$, which is nearly equal to $0.714*n_a$. If the cladding 14 meets this relation, an optical waveguide 16 which excels in optical confinement may be made.

The optical waveguide 16 may include the wide optical waveguide PL, an input optical waveguide 18, and four output waveguides $20_1$, $20_2$, $20_3$, and $20_4$. Thus, in this embodiment, N is equal to four. When the four output waveguides $20_1$ to $20_4$ do not have to be distinguished, they may be termed here output optical waveguides 20. The input waveguide 18 is connected to the wide optical waveguide PL.

The wide waveguide PL propagates an optical signal of different propagation modes in the direction of optical propagation. The wide waveguide PL has a planar shape that is in line symmetry with respect to a core axis Ct, which is in turn parallel to the optical direction of propagation. In the embodiment, the width of the wide waveguide PL is defined as W, the length is defined as L, and the wide waveguide PL may be a parallel plate. Interference between excited optical signals of different propagation modes at the wide waveguide PL may make the optical signal distribute to the output waveguides 20.

The input waveguide 18 is connected to the one side PL-L, which crosses the core axis Ct (for example, orthogonally). In the embodiment, the input waveguide 18 may be an input-port for the input optical signal IN, and the input waveguide 18 may be one optical waveguide, which is provided on the core axis Ct. And, in the embodiment, the input waveguide 18 has an equal-width portion 18a, and a tapering waveguide 18b that is an optional element. The equal-width portion 18a is a single mode optical waveguide whose cross section is rectangular.

The tapering waveguide 18b is provided at the edge of connection to the wide waveguide PL in the input waveguide 18. The tapering waveguide 18b has a tapered shape in the length direction, whose side of the connection to the wide waveguide PL is wider than at its connection to the equal-width portion 18a. The tapering waveguide 18b causes the optical signal IN of the single mode that has passed through the equal-width portion 18a to become diffused, so as to be coupled to the wide waveguide PL, to reduce the coupling loss.

The output waveguides 20 are connected to the other side PL-R which crosses the core axis Ct (for example, orthogonally). In the embodiment, the output waveguides 20 may be output ports for output of the optical signals OUT. The output waveguides $20_1$ to $20_4$ are provided on opposite sides of, and in line symmetry with respect to the core axis Ct. The output waveguides 20 include an equal-width portion 20a, and optionally include a tapering waveguide 20b. The equal-width portion 20a is a single mode optical waveguide whose cross section is rectangular. The tapering waveguide 20b is tapered in the length direction, toward the connection to the equal-width portion 20a. The tapering waveguide 20b propagates an excited optical signal of a high-order mode, and is coupled at the wide waveguide PL to the equal-width single mode portion 20a, preventing optical leakage.

Connections j connect between the output waveguides $20_j$ and the wide waveguide PL, where j is integer from 1 to 3. As illustrated in FIG. 2, the distance in the length direction between core axes of the connection j and connection j+1 is the distance $S_j$. All of the distances $S_1$ to $S_3$ are equal in this embodiment. The relation between the distance S and width W of the wide waveguide PL is given by W=N*S, where W=4*S in an exemplary embodiment.

As is illustrated in FIG. 2, gaps G are provided between the output waveguides $20_j$ and $20_{j+1}$. The widths of the gaps G are preferably below approximately 350 nm. When the widths of the gaps G are less than approximately 350 nm, the optical reflection at gaps G may be kept below −30 dB. The lower width limit of the gaps G depends on a limitation of the device processing technology. When silicon is used for the core 12, the lower width limit of the gaps is approximately 300 nm. It is also preferred that the widths of the gaps G are within the range 300 nm to 350 nm, or as small as possible.

The invention is not limited to the disclosed embodiment. Thus, the input waveguide 18 is not limited to just a single input waveguide 18, and the number of input waveguides 18 may be selected in accordance with the design of the optical device 10. The structure of the optical device 10 is not limited that shown in FIG. 2. Further, the input waveguide 18 may be out of alignment with the core axis Ct, and the output waveguides 20 may be out of symmetry with respect to the core axis Ct. The number of output waveguides 20 is not limited to just four (N=4). When the optical device 10 is designed in accordance with the conditions 1 and 2, even though the above structures (e.g. N≠4, number of input waveguides 18 greater than one) are used, uniformity in optical intensity among optical signals OUT will increase. That is, non-uniformity in optical intensity among optical signals OUT will decrease.

Manufacturing Optical Device 10

When the optical device 10 is manufactured, a Silicon On Insulator (SOI) substrate is preferably used. This manufacturing method of the SOI substrate is that firstly, a $SiO_2$ layer is deposited on a silicon substrate, and secondly, a silicon layer is deposited on the $SiO_2$ layer. The core 12 is formed by using the uppermost silicon layer, and the cladding 14 is formed by using the $SiO_2$ layer as a BOX layer (Buried-OXide layer). Described concretely, the cladding 12 may be formed by patterning the uppermost silicon layer, for example, by dry etching. And, the cladding 14 corresponding to the $SiO_2$ layer is fabricated by depositing a layer of cladding material such as $SiO_2$ layer, for example, by CVD (Chemical Vapor Deposition) on the core 12. Manufacturing of the optical device 10 may proceed from there.

Optical Device in Accordance with Condition 1

Figure 3:
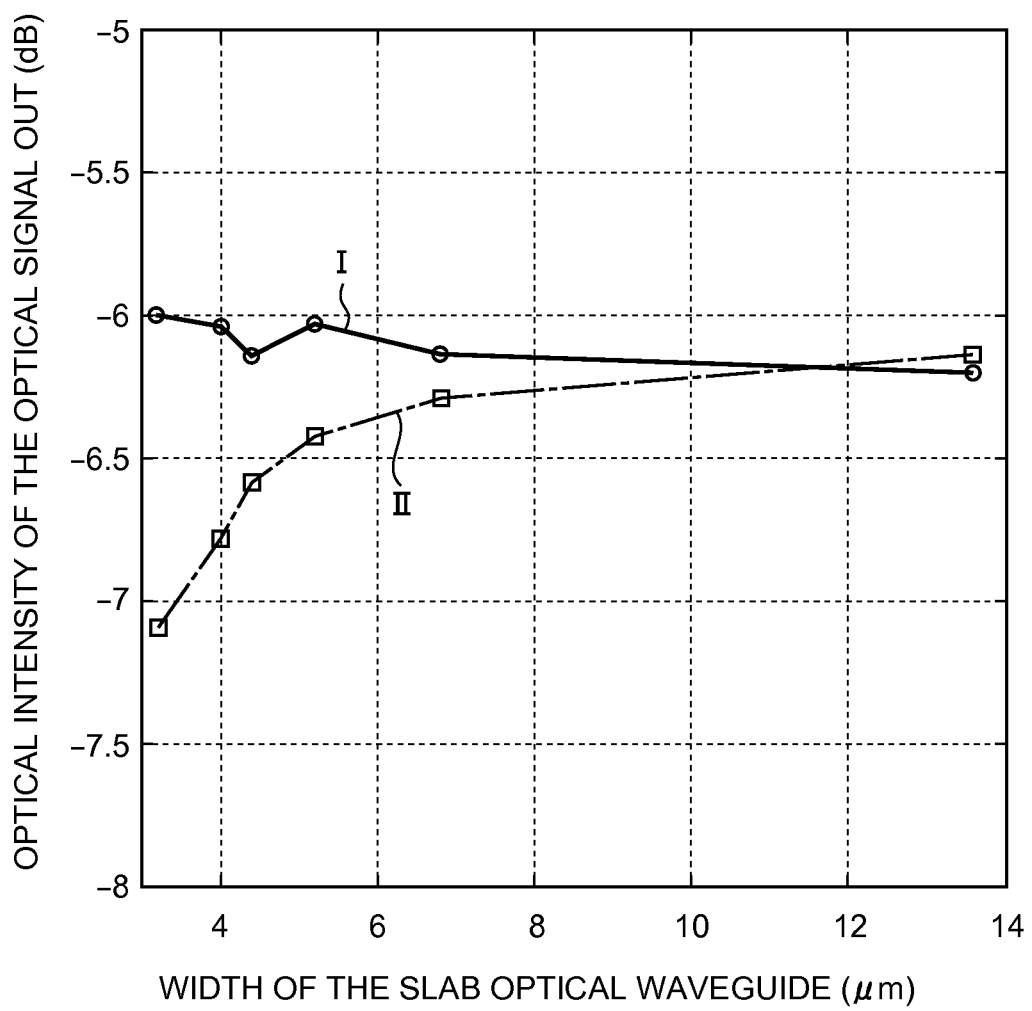
FIG. 3 illustrates a relationship between the optical intensity in output ports of a wide optical waveguide and the width of the wide optical waveguide, which is clarified by the result of a simulation of operation of the optical device of FIG. 1A.

In FIG. 3, values shown along the horizontal axis correspond to the width W of the wide waveguide PL (measured in μm), and values along the vertical axis correspond to the optical intensity of the optical signal OUT (measured in dB). And, the optical intensity of the optical signal OUT is an intensity relative to the optical intensity of the optical signal IN.

Also in FIG. 3, curve I represents the optical intensity of the optical signals OUT that are output from inner waveguides 20i (FIG. 2), and curve II represents the optical intensity of the optical signals OUT that are output from outer waveguides 20o (FIG. 2). Distances in the length direction from the core axis Ct to the output waveguides $20_y$, $20_{y+1}$ distinguish between the inner waveguides 20i and the outer waveguides 20o. For example, when the distance from the core axis Ct to the output waveguide $20_1$ is the shorter of the two output waveguides $20_1$, $20_2$, the output waveguide $20_1$ is defined as the inner waveguide 20i, and the output waveguide $20_2$ is defined as the outer waveguide 20o. As shown in FIG. 2, when N is equal to four, the output waveguides $20_2$, $20_3$ are defined as the inner waveguides 20i, and the output waveguides $20_1$, $20_4$ are defined as the outer waveguides 20o.

Using Parameters of the Condition 1

Hereinafter, parameters of the condition 1 in an embodiment of the invention are described below in items (1) to (8).

(1) The input optical signal IN is the TE polarized light of the wavelength (lambda) that is 1.55 μm.

(2) The refractive index of the core 12 is approximately 3.47, and the core 12 is made from Si.

(3) The refractive index of the cladding 14 is approximately 1.45, and the cladding 14 is made from $SiO_2$.

(4) The thickness of the core 12 is approximately 2 μm.

(5) The length of the tapering waveguide 18b is approximately 2 μm.

(6) All of the center intervals S of the output waveguides 20 are W/4.

(7) The intensity of the output optical signal is calculated at the boundary portion that connects the equal-width portion 20a and the tapering waveguide 20b.

(8) The optical device 10 has a structure that is in line symmetry with respect to a core axis Ct.

As illustrated in FIG. 3, when the width W of the wide waveguide PL is in the range from approximately 3.5 to 12 μm, the values of the curve I are larger than those of the curve II. In addition, when the width W is 12 μm, the values of the curve I are equal to those of the curve II. This would mean that the non-uniformity in optical intensity among optical signals OUT from the inner waveguides 20i and the outer waveguides 20o may be resolved as the width W becomes larger.

The differences in optical intensity among output ports in the MMI type 1*N coupler should be within 0.5 dB. As shown in FIG. 3, when the width W of the wide waveguide PL is over approximately 8 μm, the differences in optical intensity among output ports in the MMI type 1*N coupler can be held to within 0.5 dB. When N is equal to 8, that is to say, the MMI type 1*N coupler has eight output waveguides and the width W of the wide waveguide PL exceeds approximately 15 μm, the differences in optical intensity among output ports in the MMI type 1*N coupler could be held to within 0.5 dB.

When the differences in optical intensity in the optical signals OUT among output waveguides 20 should be within 0.5 dB, the width W of the MMI type 1*N coupler should be set according to N. Also, when the distribution number N is divided by the width W, the expression which is that S is larger than $4\lambda'$ (condition 1) would be determined ($S \geq 4\lambda'$).

As shown in FIG. 3, when the center interval S between output waveguide $20_y$ and $20_{y+1}$ is set to values such that the condition 1 is met, the differences in optical intensities in optical outputs OUT of the Si-type 1*N MMI coupler can be held to within 0.5 dB.

Optical Device According to Condition 2

As shown in FIG. 1B, the center interval S between output waveguide $20_y$ and $20_{y+1}$ is set to a value such that interactions are available in the condition 2. As a result of the interactions, optical power of each of them transfers between the output waveguides $20_y$ and the output waveguides $20_{y+1}$, and as a result, non-uniformity in optical intensity among the optical signals OUT may be substantially eliminated.

Referring to FIG. 2, in order to decrease non-uniformity in optical intensity among optical signals OUT, optical power should be redistributed from the inner waveguides $20i$ whose optical intensity is relatively high to the outer waveguides $20o$ whose optical intensity is relatively low. This condition for optical power transfer may be met in the case of a Si-type 1*N MMI coupler. Generally speaking, optical power is transferred from an optical signal with a relatively leading phase to an optical signal with a relatively lagging phase in an optical directional coupler that consists of two optical waveguides positioned closely together. It was found in simulations that the phase of the signal that propagates through the inner waveguides $20i$ leads the phase of the signal that propagates through the outer waveguides $20o$.

In view of the above description, when the optical directional coupler has the inner waveguides $20i$ and the outer waveguides $20o$, optical power is able to be transferred with certainty from the inner waveguides $20i$ whose optical intensity is relatively high to the outer waveguides $20o$ whose optical intensity is relatively low.

Hence, the transfer of optical power between the inner waveguides $20i$ and the outer waveguides $20o$ is employed to decrease non-uniformity in optical intensity among optical signals OUT. The optical signal between the inner waveguides $20i$ and the outer waveguides $20o$ is needed to decrease non-uniformity in optical intensity among the optical signals OUT.

Hereinafter, the equation (1) will be described. Referring to the equation 1, Io is amplitude of the second optical signal that propagates through the outer waveguides $20o$. Ii is amplitude of the first optical signal that propagates through the inner waveguides $20i$. The optical power (corresponding to an amplitude difference ΔI) may transfer from the first optical signal of the inner waveguides $20i$ to the second optical signal of the outer waveguides $20o$.

Even though optical power corresponding to ΔI transfers, the total of the optical power of the first optical signal and the second optical signal doesn't change. In view of the above description, the equation (1) may hold.

$$(Ii-\Delta I)^2 + (Io+\Delta I)^2 = Ii^2 + Io^2 \qquad (1)$$

Further, in a result of transfer of optical power from the first optical signal to the second optical signal, the intensity of the first optical signal is equal to that of the second optical signal. As referred to hereinafter, the equation (2) may hold.

$$(Ii-\Delta I)^2 - (Io+\Delta I)^2 = 0 \qquad (2)$$

When the equations (1) and (2) as the system of equations are solved, the equation (3), hereinafter, is be obtained.

$$\Delta I = (Ii^2 - Io^2)/(4*Ii) \qquad (3)$$

The equation (3) is transformed to the equation (4), hereinafter.

$$\Delta I/Ii = (Ii^2 - Io^2)/Ii^2 * (1/4) \qquad (4)$$

When both sides of each equation (4) are squared, the equation (5), hereinafter, would be obtained.

$$(\Delta I/Ii)^2 = ((Ii^2 - Io^2)/Ii^2)^2 * (1/4)^2 \qquad (5)$$

The right side of the equation (5) means that the difference $(Ii^2 - Io^2)$ of optical intensity between the inner waveguides $20i$ and the outer waveguides $20o$ is divided by the optical intensity $(Ii^2)$ of the inner waveguide $20i$. $(Ii^2 - Io^2)/(Ii^2)$ corresponds to the vertical differences of both curve-I and curve-II in FIG. 3. The left side $(\Delta I/Ii)^2$ of the equation (5) means the measurement represents the transfer of the optical power (corresponding to ΔI), which is converted to a measurement in decibels (dB).

For example, when elimination of a non-uniformity in optical intensity among optical signals OUT of approximately 1 dB (W is approximately 3 μm, FIG. 3) is required, a value of −1 dB is substituted into $(Ii^2 - Io^2)/(Ii^2)$ of equation (5), and it is found by calculation that the optical power $(\Delta I/Ii)^2$ is −24 dB. That is to say, when the non-uniformity is approximately 1 dB, and −24 dB of optical power transfers from the inner waveguides $20i$ to the outer waveguides $20o$, the non-uniformity is eliminated.

Figure 4:
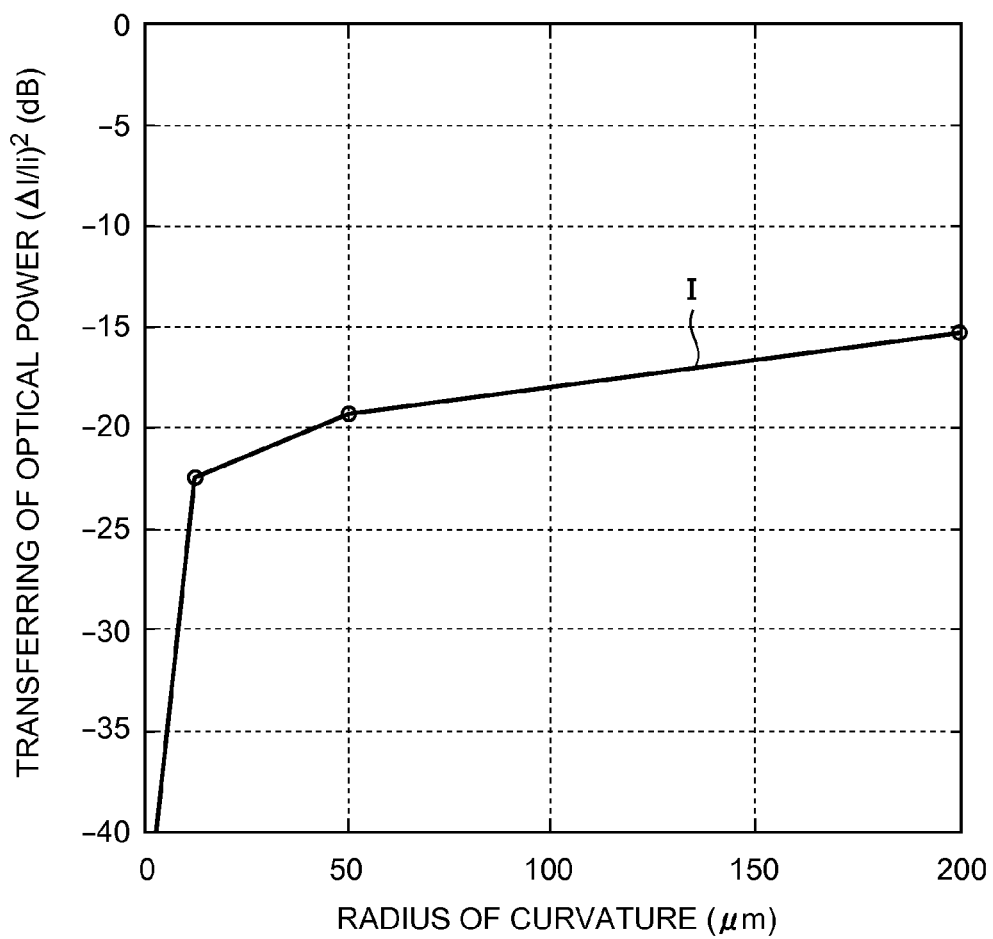
FIG. 4 illustrates the relation between the radius of curvature in an inner optical waveguide and transferring optical power from inner optical waveguides to outer optical waveguides, based upon the result of a simulation of operation of the optical device of FIG. 1A.

Referring to FIG. 4, description is now made of the magnitude of optical power transference from the inner waveguides $20i$ to the outer waveguides $20o$, which is simulated under the more realistic condition employed.

FIG. 4 is a graph showing the radius of curvature (in μm) along the abscissa axis and transference of optical power corresponding to the above-described $(\Delta I/Ii)^2$ (in dB) along the ordinate axis. The transference of optical power in FIG. 4 is calculated in a similar way to that in FIG. 3, except as described hereinafter.

Using these Parameters in Simulation (1) The center intervals S between the inner waveguides $20i$ and the outer waveguides $20o$ are approximately 800 nm. This interval S correspond to approximately 3.2 μm of the width W in the wide waveguide PL.

(2) The width of gaps G are approximately 300 nm.

(3) The optical signal is input into only the inner waveguides $20i$. Transference of optical power is evaluated based upon the optical intensity at the edges of the outer waveguides $20o$. That is, FIG. 4 shows that the optical signal may not be input into the outer waveguides $20o$.

(4) The radius of curvature of the inner waveguides $20i$ is three times longer than that of the outer waveguides $20o$. This means that gaps between the inner waveguides $20i$ and the outer waveguides $20o$ widen gradually along the direction of optical propagation.

When the parameters are determined as described above, an optical directional coupler that keeps the center intervals S within 1000 nm may be created. As a result, optical power that transmits via the optical directional coupler transfers from the inner waveguides $20i$ to the outer waveguides $20o$.

As shown by the curve-I of FIG. 4, as the radius of curvature of the inner waveguides $20i$ becomes longer, the transference of optical power from the inner waveguides 20$i$ to the outer waveguides 20$o$ increases rapidly. When the radius of curvature of the inner waveguide 20$i$ is approximately 10 μm, the transferred optical power is approximately −24 dB, which is calculated based upon the above equation (5).

As shown in FIG. 4, when the optical directional coupler that has the inner waveguides 20$i$ and the outer waveguides 20$o$ is designed appropriately, the uniformity in optical intensity among the optical signals OUT may increase.

Figure 5:
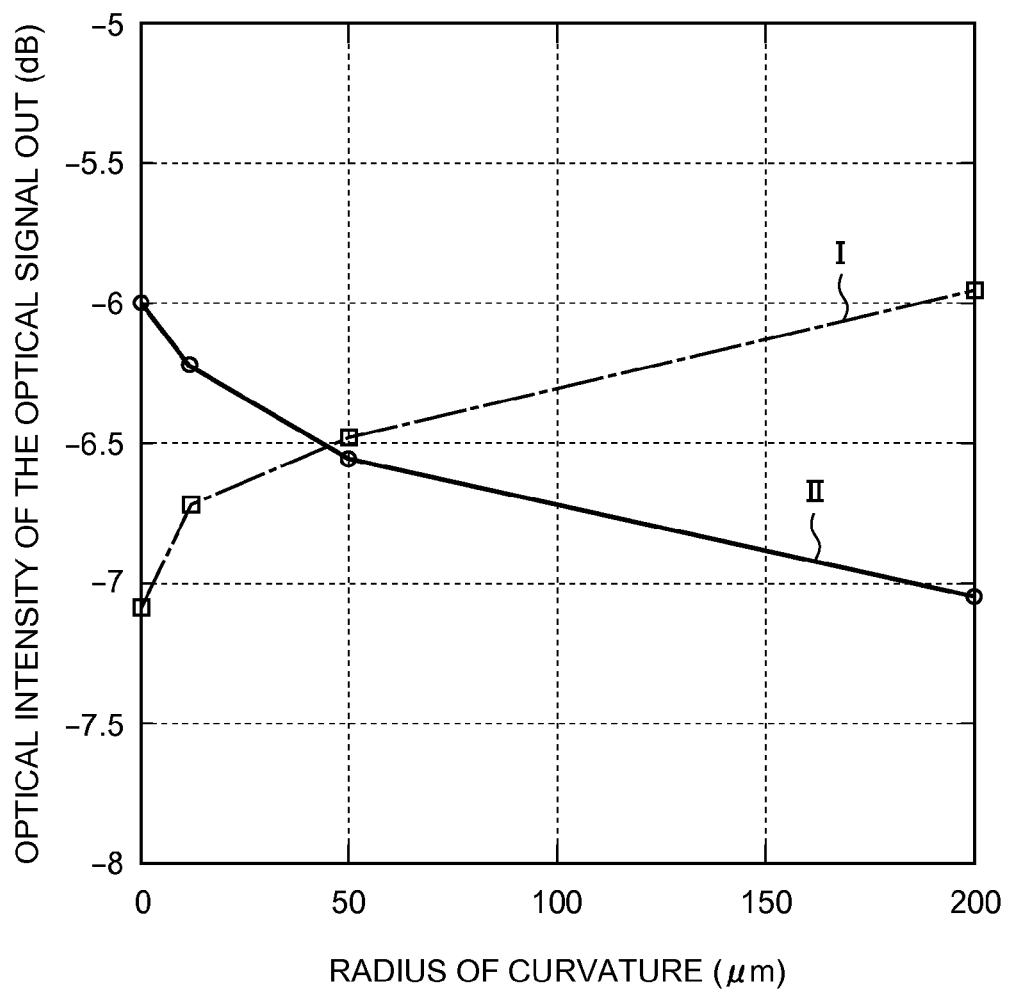
FIG. 5 illustrates the relation between the radius of curvature in an inner optical waveguide and the optical intensity in output ports, which is clarified by the result of a simulation of operation of the optical device of FIG. 1B.
Figure 6:
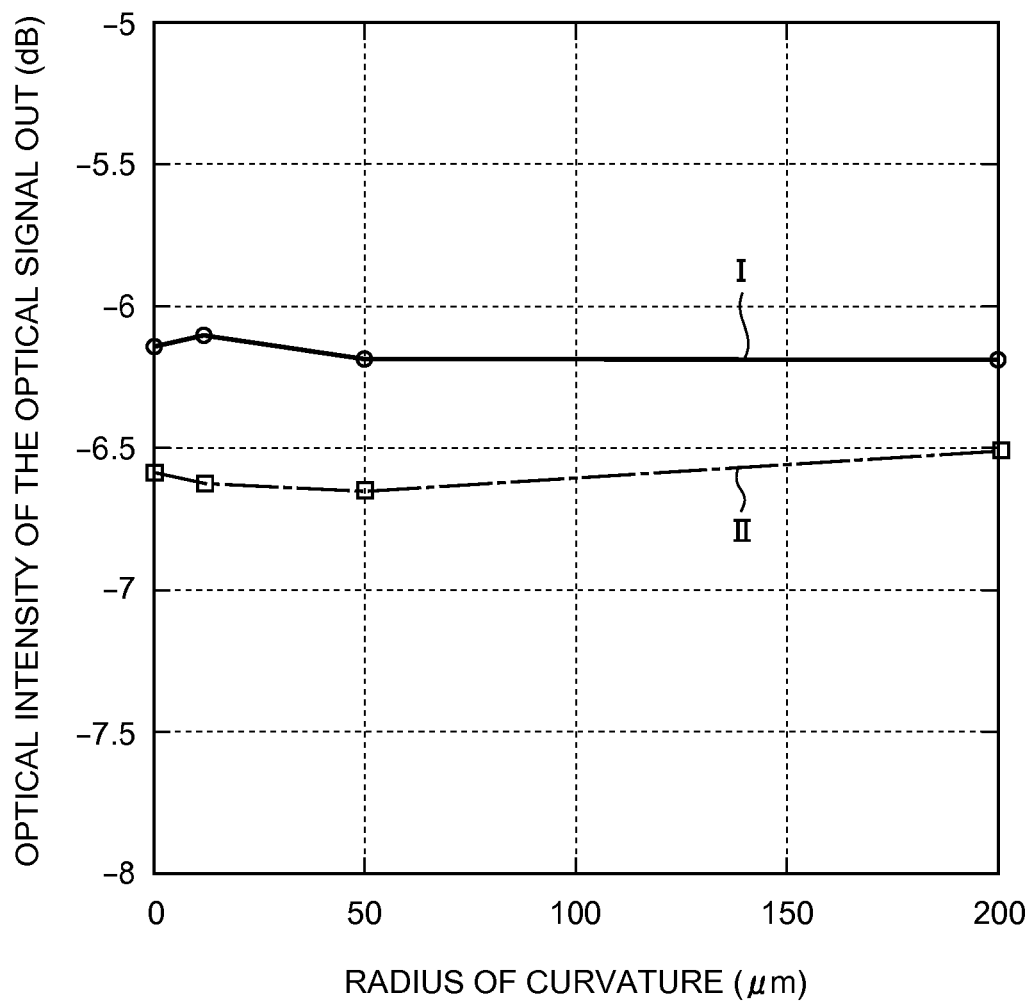
FIG. 6 illustrates the relation between the radius of curvature in inner optical waveguides and the optical intensity in output ports, which is clarified by the result of a simulation of operation of a prior art optical device.

As shown in FIGS. 5 and 6, values along the horizontal axis correspond to the radius of curvature of the inner waveguides 20$i$ (measured in μm), and values along the vertical axis corresponds to the optical intensity of the optical signals OUT (measured in dB). And, the optical intensity of the optical signals OUT is an intensity that is relative to the optical intensity of the optical signal IN. The optical device in FIG. 5 is similar in construction to the optical device in FIG. 4. The length L of the wide waveguide PL is approximately 4 μm.

The curve-I in FIG. 5 corresponds to the optical intensity of the optical signals OUT output from the inner waveguides 20$i$. And, the curve-II in FIG. 5 corresponds to the optical intensity of the optical signals OUT output from the outer waveguides 20$o$.

As shown in FIG. 5, when the radius of curvature of the inner waveguides 20$i$ is approximately 150 μm, and the radius of curvature of the outer waveguides 20$o$ is approximately 50 μm, the curve-I is nearly coincident with the curve-II, so that non-uniformity in optical intensity among the optical signals OUT may be eliminated.

FIG. 6 illustrates a relation that does not meet condition 2 of the center intervals S, between the radius of curvature of inner waveguides 20$i$ and the optical intensity in the output ports. As shown in FIG. 6, the center intervals S are approximately 1100 nm. As a result, the width W and length L of the wide waveguide PL are approximately 4.4 μm and 8.5 μm, respectively. The condition in FIG. 6 is similar to that in FIG. 5, except as described above.

The curve-I in FIG. 6 corresponds to the optical intensity of the optical signals OUT output from the inner waveguides 20$i$. The curve-II in FIG. 6 corresponds to the optical intensity of the optical signals OUT output from the outer waveguides 20$o$. As shown in FIG. 6, but not in FIG. 5, although the radius of curvature in inner waveguides 20$i$ may become longer or shorter, transference of optical power from the inner waveguides 20$i$ to the outer waveguides 20$o$ is vanishingly small.

Considering and comparing FIG. 5 and FIG. 6, it is found that the inner waveguides 20$i$ and the outer waveguides 20$o$ may fulfill a function as an optical directional coupler in accordance with condition 2 of the center intervals S, between the inner waveguides 20$i$ and the outer waveguides 20$o$. And, when the optical directional coupler is designed appropriately, uniformity in optical intensity among optical signals OUT may increase.

Those skilled in the art will recognize that further variations of the preceding embodiment are possible within the scope of the invention, as defined by the appended claims. For example, the optical directional coupler may be not only linkage with the wide optical PL but also away from the wide waveguide PL. That is, the center intervals S may be not only at the connective portion, where the center intervals S are on other side PL-R, but also at the apart portion, where the center intervals S are apart from the other side PL-R. Though, if center intervals between the output waveguides 20 on the one side PL-R are equal to the length of the apart portion, the uniformity in optical intensity among the optical signals OUT may increase.

What is claimed is:

1. An optical device, comprising
an optical waveguide having a core and a cladding, the optical waveguide including a wide optical waveguide, an input optical waveguide connected with a first side of the wide optical waveguide, and four output optical waveguides connected with a second side of the wide optical waveguide, wherein
the wide optical waveguide is configured to propagate an optical signal in an optical direction of propagation, the wide optical waveguide being of a planar shape, which is in line symmetry with respect to a core axis parallel to the optical direction of propagation;
the first and second sides of the wide optical waveguide are opposite to each other and are substantially perpendicular to the core axis;
the input optical waveguide is formed on the core axis, and the four output optical waveguides are disposed in symmetry with respect to the core axis, optical axes of the output optical waveguides being parallel to the core axis;
measured orthogonally to the core axis, a center interval S between optical axes of any adjacent two of the output optical waveguides is of a same length, and a width of the wide optical waveguide is equal to four times of the center interval S;
the four output optical waveguides include two inner optical waveguides located on opposite sides of the core axis and two outer optical waveguides located on opposite sides of the two inner optical waveguides, the two inner optical waveguides being closer to the core axis than the two outer optical waveguides;
designating $I_i$ as the amplitude of a first optical signal that propagates through the inner optical waveguides, and $I_o$ as the amplitude of a second optical signal that propagates through the outer optical waveguides, and defining $\Delta I$ as $(I_i^2 - I_o^2)/(4*I_i)$, optical power $(\Delta I/I_i)^2$ equals −24 dB; and
the center interval S meets one of conditions 1 and 2, wherein
the condition 1 is that the center interval S is wider than or equal to 4λ', where λ' is the optical wavelength of the optical signal in the wide optical waveguide, and
the condition 2 is that the center interval S is narrower than 4λ', and is shorter than a length in which any adjacent two of the output optical waveguides are adjacent.

2. The optical device in accordance with claim 1, wherein the center interval satisfies the condition 2 and is narrower than 1000 nm.

3. The optical device in accordance with claim 1, wherein the inner optical waveguides each have a radius of curvature that is three times longer than that of the outer optical waveguides.

4. The optical device in accordance with claim 1, wherein the width of the wide optical waveguide is greater than or equal to 8 μm.

5. The optical device in accordance with claim 1, wherein the width of the wide optical waveguide is greater than or equal to 15 μm.

6. The optical device in accordance with claim 1, wherein the input optical waveguide is a single waveguide, and light propagates into the wide optical waveguide only through the input optical waveguide.

7. The optical device in accordance with claim 1, wherein the width of the wide optical waveguide, measured in a direction orthogonal to the direction of propagation of the input optical signal, is equal to the length of the center interval S multiplied by the number of the output optical waveguides.

8. The optical device in accordance with claim 1, wherein the input optical waveguide and the output optical waveguides are single-mode waveguides.

9. The optical device in accordance with claim 1, wherein the core is formed of silicon dioxide, and the cladding is formed of silicon and has a refractive index that is no greater than 0.714 times of a refractive index of the core.

* * * * *